US012659371B2

(12) United States Patent
Larsson et al.

(10) Patent No.: US 12,659,371 B2
(45) Date of Patent: Jun. 16, 2026

(54) CAMERA NETWORK FOR ENHANCING INDUSTRIAL MONITORING AND SECURITY

(71) Applicant: Rhombus Systems, Sacramento, CA (US)

(72) Inventors: Garrett Larsson, Carmichael, CA (US); Omar Khan, San Ramon, CA (US); Jonathan Egan Salcedo, San Francisco, CA (US)

(73) Assignee: Rhombus Systems

( * ) Notice: Subject to any disclaimer, the term of this patent is extended or adjusted under 35 U.S.C. 154(b) by 0 days.

(21) Appl. No.: 18/196,999

(22) Filed: May 12, 2023

(65) Prior Publication Data

US 2024/0121304 A1    Apr. 11, 2024

Related U.S. Application Data

(63) Continuation of application No. 16/506,821, filed on Jul. 9, 2019, now Pat. No. 11,677,828.

(51) Int. Cl.
*G06F 15/177* (2006.01)
*G06T 7/00* (2017.01)
(Continued)

(52) U.S. Cl.
CPC ............ *H04L 67/12* (2013.01); *G06T 7/0004* (2013.01); *G06T 7/70* (2017.01); *G06V 20/52* (2022.01);
(Continued)

(58) Field of Classification Search
CPC ................. G06V 20/52; G06V 40/172; G06T 2207/30232; G06T 7/0004; G06T 7/70;
(Continued)

(56) References Cited

U.S. PATENT DOCUMENTS 10,574,945 B1    2/2020   Seyfi et al.
11,196,968 B1    12/2021  Kerzner et al.
(Continued)

FOREIGN PATENT DOCUMENTS

EP        1 057 545 A2    12/2000
EP        3 032 508 A1    6/2016

OTHER PUBLICATIONS

Final Office Action on U.S. Appl. No. 16/506,821 dated Dec. 9, 2022.

(Continued)

*Primary Examiner* — Suraj M Joshi
*Assistant Examiner* — Hao H Nguyen
(74) *Attorney, Agent, or Firm* — Foley & Lardner LLP

(57) ABSTRACT

A sensor monitoring system includes a plurality of image capture devices. Each image capture device includes one or more sensors to detect image data representing an environment about the image capture device, communications circuitry to receive sensor data from a sensor device and remote sensor data including at least one of a second image of the sensor or second position data regarding the sensor device, and processing circuitry to validate the sensor device based on the sensor data, determine first position data regarding the sensor device based on at least one of the first network connection or the remote sensor data, determine that the sensor device is in an image capture range based on the first position data, retrieve one or more images of the sensor device, and generate an alert based on the first position data.

20 Claims, 4 Drawing Sheets

100

(51) Int. Cl.

| | |
|---|---|
| *G06T 7/70* | (2017.01) |
| *G06V 20/52* | (2022.01) |
| *G08B 21/18* | (2006.01) |
| *H04L 9/32* | (2006.01) |
| *H04L 67/12* | (2022.01) |
| *H04N 23/90* | (2023.01) |
| *H04W 76/19* | (2018.01) |
| *G06V 40/16* | (2022.01) |

(52) U.S. Cl.
CPC ............... *G08B 21/18* (2013.01); *H04L 9/32* (2013.01); *H04N 23/90* (2023.01); *H04W 76/19* (2018.02); *G06T 2207/30232* (2013.01); *G06V 40/172* (2022.01)

(58) Field of Classification Search
CPC . G06T 7/11; G06T 2207/30252; G08B 21/18; H04W 76/19; H04N 23/90; H04N 23/661; H04N 7/181; H04N 7/185; H04L 63/0492; H04L 67/12; H04L 9/32
See application file for complete search history.

(56) References Cited

U.S. PATENT DOCUMENTS

| | | | | |
|---|---|---|---|---|
| 2006/0088196 A1* | 4/2006 | Popovich, Jr. | ......... | G06V 20/66 382/128 |
| 2006/0171453 A1* | 8/2006 | Rohlfing | .......... | G08B 13/19673 348/E7.086 |
| 2008/0240696 A1* | 10/2008 | Kucharyson | ........... | H04N 7/181 348/E7.086 |
| 2009/0012633 A1* | 1/2009 | Liu | ......................... | G06F 1/206 700/90 |
| 2010/0246421 A1* | 9/2010 | Marshall | ................. | H04L 41/12 370/252 |
| 2013/0073852 A1* | 3/2013 | Oba | .................... | H04W 12/106 713/168 |
| 2015/0039135 A1* | 2/2015 | Mori | ...................... | G05B 15/02 700/276 |
| 2015/0188938 A1* | 7/2015 | Freeze-Skret | .......... | H04L 63/08 726/22 |
| 2016/0088326 A1 | 3/2016 | Solomon et al. | | |
| 2016/0173827 A1* | 6/2016 | Dannan | .................. | H04N 7/181 348/143 |
| 2016/0277955 A1* | 9/2016 | Suzuki | ................... | H04W 48/16 |
| 2016/0373302 A1* | 12/2016 | Sigoure | ................. | H04L 41/046 |
| 2017/0127301 A1* | 5/2017 | Sharma | ................... | H04L 41/28 |
| 2017/0303119 A1* | 10/2017 | Ogura | ................... | H04W 12/03 |
| 2017/0316574 A1 | 11/2017 | Karame et al. | | |
| 2018/0107955 A1* | 4/2018 | Walden | ............. | G06Q 30/0267 |
| 2018/0182214 A1 | 6/2018 | Qi et al. | | |
| 2018/0232592 A1* | 8/2018 | Stewart | ........... | G08B 13/19606 |
| 2018/0262497 A1* | 9/2018 | Raje | ........................ | G06F 21/35 |
| 2018/0317175 A1* | 11/2018 | Seto | .................. | H04W 52/0216 |
| 2018/0332434 A1* | 11/2018 | Kulkarni | ................ | H04L 43/08 |
| 2019/0069306 A1* | 2/2019 | Fukuta | ................ | H04W 72/542 |
| 2019/0095670 A1* | 3/2019 | Xu | ......................... | G06F 1/3206 |
| 2019/0104561 A1* | 4/2019 | Fujinaga | ............... | H04W 12/08 |
| 2020/0265700 A1* | 8/2020 | Bergman | ............. | G08B 25/016 |
| 2020/0359456 A1* | 11/2020 | Suzuki | ................... | H04W 88/06 |
| 2021/0341319 A1* | 11/2021 | Hartung | ................. | G01D 18/00 |
| 2022/0070414 A1* | 3/2022 | Kerzner | ........... | G08B 13/19682 |
| 2023/0349090 A1* | 11/2023 | Kim | ........................ | D06F 34/26 |
| 2023/0359979 A1* | 11/2023 | Hamm | ................ | G06Q 10/087 |
| 2024/0045409 A1* | 2/2024 | Kiritani | .............. | G05B 19/4183 |

OTHER PUBLICATIONS

Final Office Action on U.S. Appl. No. 16/506,821 dated May 24, 2021.

International Preliminary Report on Patentability on PCT PCT/IB2020/056230 dated Jan. 11, 2022 (10 pgs.)f.

International Search Report and Written Opinion in PCT/IB2020/056230 mailed Aug. 14, 2020 (16 pgs.).

Non-Final Office Action on U.S. Appl. No. 16/506,821 dated Mar. 13, 2020.

Non-Final Office Action on U.S. Appl. No. 16/506,821 dated Mar. 4, 2022.

Non-Final Office Action on U.S. Appl. No. 16/506,821 dated Oct. 1, 2020.

Notice of Allowance on U.S. Appl. No. 16/506,821, filed Feb. 1, 2023.

* cited by examiner

100

104

300

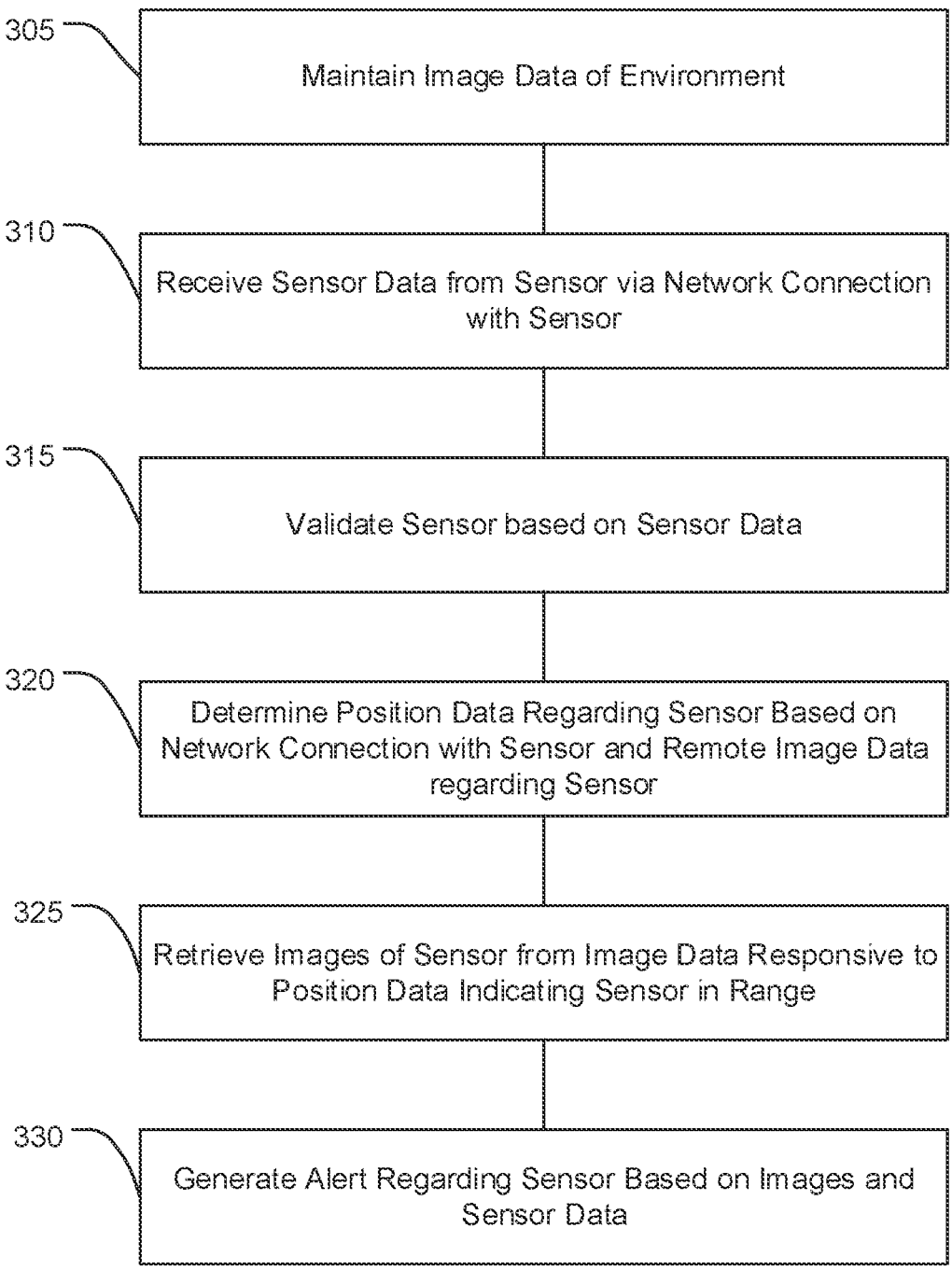

305 — Maintain Image Data of Environment

310 — Receive Sensor Data from Sensor via Network Connection with Sensor

315 — Validate Sensor based on Sensor Data

320 — Determine Position Data Regarding Sensor Based on Network Connection with Sensor and Remote Image Data regarding Sensor 325 — Retrieve Images of Sensor from Image Data Responsive to Position Data Indicating Sensor in Range 330 — Generate Alert Regarding Sensor Based on Images and Sensor Data

FIG. 3

CAMERA NETWORK FOR ENHANCING INDUSTRIAL MONITORING AND SECURITY

CROSS-REFERENCE TO RELATED APPLICATIONS

This application is a continuation of U.S. patent application Ser. No. 16/506,821, filed Jul. 9, 2019, patented as U.S. Pat. No. 11,677,828, the disclosure of which is incorporated herein by reference in its entirety.

BACKGROUND

The present disclosure relates generally to the field of industrial monitoring and security devices. More particularly, the present disclosure relates to systems and methods for a camera-based mesh network for enhanced industrial monitoring and security.

Industrial monitoring devices, such as a variety of available sensors suitable for use for deployment in a variety of sensor networks (often referred to as Internet of Things (IoT) sensors and/or networks), can be used to detect and monitor various assets and hardware in large enterprises, warehouses, buildings, and spaces. Some IoT sensor networks use a hub that controls a connection between the IoT sensors and an external network connection.

SUMMARY

Systems and methods according to certain aspects of the present disclosure can enable an integrated asset management and security system for various assets, leveraging an easily deployable mesh network implemented by image capture devices (e.g., cameras). Industrial monitoring devices, such as IoT sensors, can be used to detect and monitor assets, generate sensor data regarding the assets, and provide the sensor data to remote devices for further processing. The sensors can also perform at least some processing locally before providing the sensor data to remote devices.

In some systems, network hubs are used to provide a network connection for sensors to communicate with cloud servers and other remote systems (e.g., via an Internet protocol (IP) network connected with the Internet). There may be time or network operation or bandwidth management costs associated with establishing connections between each sensor and one or more hubs, and maintaining the connections, especially as sensors and associated assets may move about a large space in which the hubs are provided, in which case the sensors may move in and out of communication range of the hubs, increasing the processing demand on the hubs to reestablish connections. In addition, if the hubs lose connections with IP networks, there may be significant network downtime during which large numbers of sensors are unable to communicate sensor data with appropriate destination devices. The sensors can be battery-powered, which can enable portability, with the result that the sensors may use low power wireless communication methods and hardware (e.g., Bluetooth Low Energy (BLE), Zigbee) to connect to network gateways, cameras, and other sensors, as more power-intensive methods (e.g., WiFi, Ethernet) may not be feasible.

The present solution can enable an integrated approach for asset tracking and security functions, which can reduce hardware requirements and networking overhead and downtime, while improving system reliability and fault tolerance.

For example, multiple cameras can be provided in a space in which assets are to be monitored, such as to establish a mesh network, such as large enterprises, warehouses, buildings, and spaces. The cameras can include video cameras, and can include black and white (e.g., grayscale), color, visible light, infrared, or various other cameras. The cameras can each connect directly with the Internet or use Internet-enabled wireless and wired gateways. The cameras can each have communications circuitry to establish a mesh network with each other and with sensors in the space, such as BLE circuitry. The cameras and sensors can use the mesh network to transmit data via the Internet, such as if a camera loses a connection with the Internet or if a camera or sensor does not have Internet connection capability (e.g., due to power requirements).

The cameras can facilitate setup and deployment of network connections for sensors and other cameras, and monitor the network connections in order to repair and facilitate alternate methods for the network connections. For example, one or more of the cameras can communicate with an Internet Service Provider (ISP) device or other device that provides Internet connections to establish a connection with the Internet. The one or more cameras can request Internet connection information from the ISP device, such as IP addresses, for other cameras in the space, and provide the Internet connection information to the other cameras to enable the other cameras to be configured to communicate with the Internet without each camera being required to independently perform the network connection request process. The cameras can monitor communications with one another to detect if a particular camera has lost the network connection (e.g., if the particular camera outputs an alert indicating a lost network connection), and initiate a connection repair process to enable the particular camera to re-establish the network connection.

The cameras can receive sensor data from the sensors via the mesh network, and use the received sensor data to validate the sensors, such as by performing cryptographic operations on the sensor data to authenticate the sensors. The cameras can cooperate with one another by performing object recognition on detected images to identify the sensors (and assets) and locate the sensors in the space (e.g., by triangulating the sensors based on parameters such as camera location, camera orientation, and signal strengths of network connections with the sensors). The cameras can perform facial recognition on the detected images to identify a user operating an asset, such as to determine if the user is authorized to operate the asset. The cameras can cross-reference the sensor data and the images to determine if the assets are being properly monitored and operated, and identify error conditions regarding the assets. Various processing operations described herein as being performed by the cameras may also be performed at least in part by one or more servers in communication with the cameras via, for example, IP connections.

At least one aspect relates to a method. The method includes maintaining, by one or more processors using one or more sensors of an image capture device, image data representing an environment about the image capture device. The method includes receiving, by the one or more processors, sensor data from a sensor device. The method includes validating, by the one or more processors, the sensor device based on the received sensor data. The method includes determining, by the one or more processors, position data regarding the sensor device based on at least one of a network connection with the sensor device or remote sensor data including at least one of a second image of the sensor device or remote position data regarding the sensor device. The method includes determining, by the one or more processors, that the sensor device is in an image capture range of the image capture device based on the position data. The method includes retrieving, by the one or more processors responsive to determining that the sensor device is in the image capture range, one or more images of the sensor device from the image data. The method includes generating, by the one or more processors, an alert regarding the sensor device based on the position data.

At least one aspect relates to a system. The system includes one or more image capture devices. The image capture device includes one or more processors to process sensor data (e.g., image processors, video processors, audio processors), communications circuitry, and processing circuitry. The one or more image, video, and/or audio processors are configured to detect image data representing an environment about the image capture device. The communications circuitry is configured to receive, via a first network connection with a sensor device, sensor data. The communications circuitry is configured to receive, via a second network connection with a remote image capture device, remote sensor data including at least one of a second image of the sensor or second position data regarding the sensor device. The processing circuitry is configured to validate the sensor device based on the sensor data, determine first position data regarding the sensor device based on at least one of the first network connection or the remote sensor data, determine that the sensor device is in an image capture range of the one or more sensors based on the first position data, retrieve one or more images of the sensor device from the image data responsive to determining that the sensor device is in the image capture range, and generate an alert regarding the sensor device based on the first position data.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings:

FIG. 3 is a flow diagram of a method for operating a camera-based mesh network for industrial monitoring and security according to an embodiment of the present disclosure.

DETAILED DESCRIPTION

Figure 1:
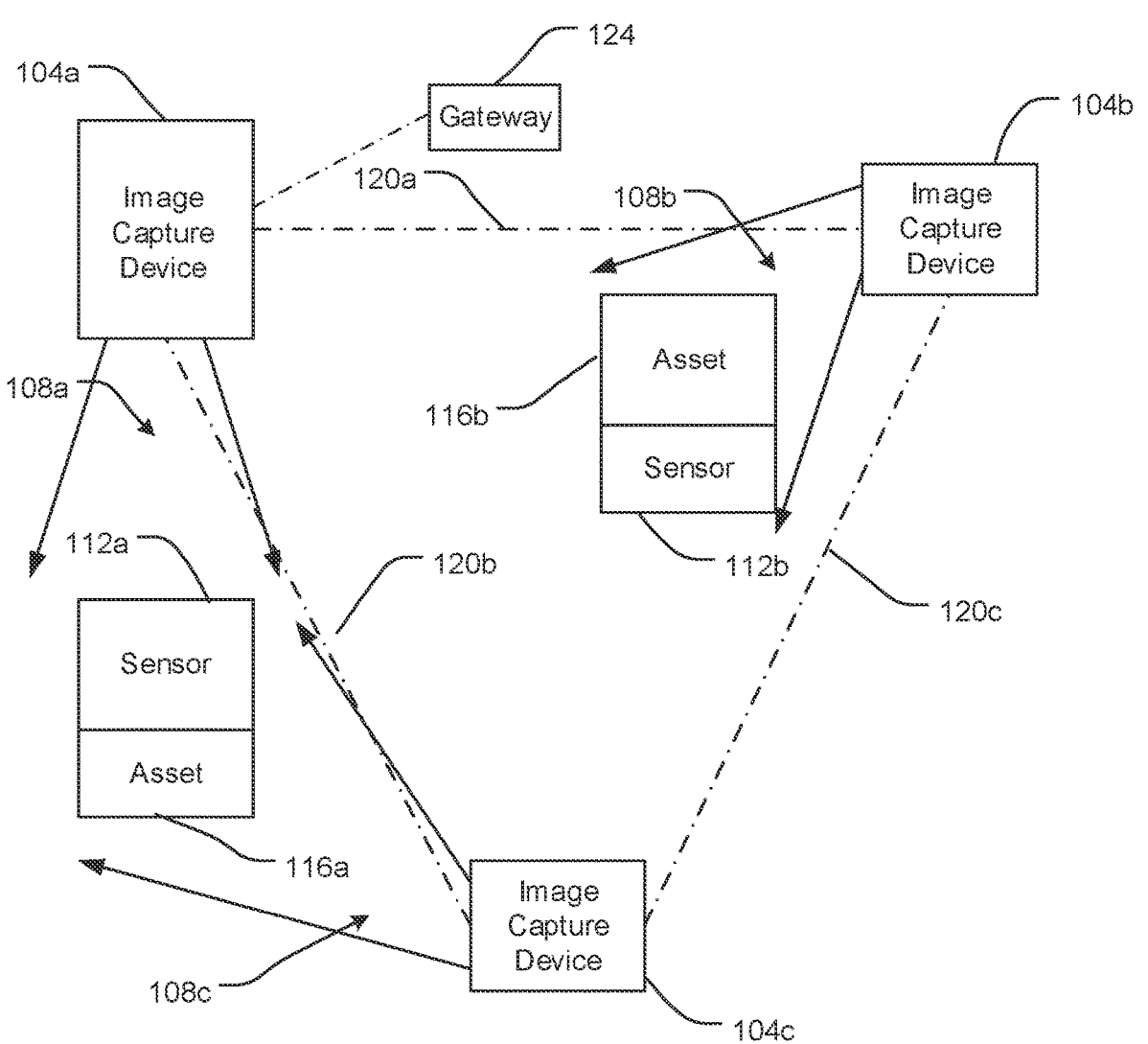
FIG. 1 is a block diagram of a camera-based network for industrial monitoring and security according to an embodiment of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Industrial monitoring devices, such as IoT sensors, can be used to detect and monitor assets, generate sensor data regarding the assets, and provide the sensor data to remote devices for further processing. The sensors can also perform at least some processing locally before providing the sensor data to remote devices.

In some systems, a hub is used to communicate with each sensor. The hub can receive the sensor data from each sensor, and provide the sensor data to the remote devices. The hub can provide a network connection to an external network, such as an Internet connection. The hub can use various protocols to communicate with the sensors, such as Z-wave and Zigbee. In some instances, as the number of sensors connected to hubs increases, the effectiveness of the hub(s) can decrease. For example, there may be time or network operation or bandwidth management costs associated with establishing connections between each sensor and one or more hubs, and maintaining the connections, especially as sensors and associated assets may move about a large space in which the hubs are provided, in which case the sensors may move in and out of communication range of the hubs, increasing the processing demand on the hubs to reestablish connections. If the hubs lose connections with IP networks, there may be significant network downtime during which large numbers of sensors are unable to communicate sensor data with appropriate destination devices.

In certain aspects of the present solution, systems and methods can use image capture devices, such as cameras that have network communication capabilities, to implement a network for sensor communication. The present solution can enable an integrated approach for asset tracking and security functions, which can reduce hardware requirements and networking overhead and downtime, while improving system reliability and fault tolerance. Such systems can scale to supporting communication with a large number of sensors without requiring a single hub to continually establish, maintain, and re-establish network connections with the sensors. In some embodiments, the network (e.g., the image capture devices implementing the network) can operate using a Bluetooth low energy (BLE) protocol with sensors and with one another. The network can receive authentication data from the sensors to validate the sensors. The network can use image data from various image capture devices to perform object recognition, such as to identify sensors, identify assets, determine accurate positions regarding sensors and assets, and generate alerts regarding sensors or assets accordingly. The network can use facial recognition to identify persons associated with assets, such as to determine whether a user of an asset is expected or authorized to be using the asset. In some embodiments each camera in the network may directly communicate to the internet while in other the devices may create a mesh network (in whole or in part).

For example, in some embodiments, a sensor monitoring system can include a plurality of image capture devices that include one or more sensors that detect and maintain image data representing an environment about the image capture device. The image capture devices can include communications circuitry, which may include a transceiver to communicate with the sensors (e.g., via a BLE protocol) and a gateway to establish an external network connection (e.g., to the Internet). The image capture device can include processing circuitry that receives sensor data from a sensor device and validates the sensor based on the sensor data. The processing circuitry can determine position data regarding the sensor device based on at least one of a network connection with the sensor device (e.g., based on signal strength of the network connection) or remote sensor data including at least one of a second image of the sensor device or position data regarding the sensor device. The processing circuitry can determine that the sensor device is in an image capture range of the image capture device based on the position data. The processing circuitry can retrieve one or more images of the sensor device from the image data in response to determining that the sensor device is in the image capture range, one or more images of the sensor device from the image data. The processing circuitry can generate an alert regarding the sensor device based on the position of the sensor device as indicated by the position data.

Referring now to FIG. 1, a network 100 is illustrated according to an embodiment of the present disclosure. The network 100 can include a plurality of image capture devices 104a, 104b, 104c (generally referred to as image capture devices 104) that can communicate image data with one another, receive sensor data from one or more sensors 112a, 112b (generally referred to as sensors 112), and communicate the received sensor data with one another. Each image capture device 104 may also (or instead) communicate directly with the internet. The sensors 112 can be associated with respective assets 116a, 116b (generally referred to as assets 116). The image capture devices 104, sensors 112, and assets 116 may be provided in any of a variety of environments, such as buildings, outdoor spaces, manufacturing facilities or plants, storage spaces, medical facilities, or any combination thereof.

The image capture device 104 can receive light from the environment and generate images based on the received light. The image capture devices 104a, 104b, 104c can have respective fields of view 108a, 108b, 108c (generally referred to as fields of view 108). The field of view 108 can correspond to a region of the environment from which the lens of the image capture device 104 receives light to generate images. As illustrated in FIG. 1, the sensor 112a and asset 116a are in each of the fields of view 108a, 108b, 108c, while the sensor 112b and asset 116b are not in the fields of view 108a, 108c. The image capture device 104 may capture still images and/or videographic information of any sort, and may capture image and/or videographic information with the application of a variety of filters (such as, for example filters that enable the ability to capture images and/or video at night). In some embodiments, image capture device 104 may be an infrared camera, a visible light camera, or any combination thereof. Image capture device 104 may output video data, image data, or image stream data.

The image capture devices 104 can be stationary or mobile. The image capture devices 104 can be fixed to structures in the environment, such as walls, ceilings, doors or door frames, struts, or rails in the environment. The image capture devices 104 can be adjustable in position or orientation, such as being adjustably fixed to a structure in the environment. For example, the image capture devices 104 can include or be coupled with a drive (e.g., any of a motor, gears, linkages, or combinations thereof) that can be used to adjust at least one of a pan angle or tilt angle of the image capture devices 104. The image capture devices 104 can be adjusted in position or orientation manually or responsive to control of the drive.

The image capture devices 104 can establish communication links 120a, 120b, 120c (generally referred to as communication links 120) with one another, enabling the image capture devices 104 to establish a mesh network. For example, each image capture device 104 can act as a node of the mesh network. Each image capture device 104 can maintain a data structure indicating at least one or more remote image capture devices 104 to which the image capture device 104 is connected. In some embodiments, the data structure indicates all of the communication links 120 between image capture devices 104, enabling each image capture device 104 to process the data structure to identify a communication path along the communication links via which data can be provided to a particular remote image capture device 104. For example, the image capture device 104 can forward data packets received via communication links 120 to appropriate destination image capture devices 104 using the identified communication path. In some embodiments each image capture device 104 may also (or instead) connect directly to the internet without relying on a mesh network.

The image capture devices 104 can use various communication protocols to establish the mesh network, such as Bluetooth, Bluetooth low energy (BLE), Zigbee, Z-wave, near field communication (NFC), or WiFi protocols. The image capture devices 104 can communicate various data with one another using the communication links 120, including but not limited to sensor data received from sensors 112, image data regarding sensors 112 and assets 116, and authentication data regarding sensors 112. The image capture devices 104 can monitor the communication links 120 to determine whether a particular image capture device 104 disconnects from a respective communication link 120, and output an alert responsive to detecting the disconnection of the image capture device 104.

In some embodiments, one or more of the image capture devices 104 includes a gateway 124. The gateway 124 can be used to establish and maintain an internet protocol (IP) connection with a remote device, such as to establish a connection with the Internet. For example, the gateway 124 can include an IP router or modem. In some embodiments, each of the image capture devices 104 includes a respective gateway 124.

In some embodiments, the image capture devices 104 can cooperate to establish network connections with the Internet, such that one or more image capture devices 104 can facilitate network connection establishment on behalf of the remaining image capture devices 104. As such, the image capture devices 104 can more rapidly be deployed and set up in the environment. For example, the image capture device 104a can provide network configuration information to the image capture devices 104b, 104c. The network configuration information can include an IP address or an IP subnet. The network configuration information can include a network identifier and key for access the network. The image capture device 104a can provide network configuration information to each corresponding image capture device 104, such as to assign an IP address to each corresponding image capture device 104. The image capture device 104a can use the communication links 120 to provide the network configuration information.

In some embodiments, the image capture device 104 use WiFi connections to connect with the Internet. For example, the first image capture device 104a can receive a WiFi network identifier (e.g., service set identifier (S SID)) and a network key (e.g., a pre-shared key (PSK) or a WiFi certificate). The image capture device 104a can provide the WiFi network identifier and the network key to a WiFi transceiver to connect with the WiFi network operated by the WiFi transceiver (which may be connected with the Internet). The image capture device 104a can dynamically be assigned network connection information, such as IP address, DNS, gateway, and subnet mask information using dynamic host configuration protocol (DHCP). In some embodiments, the image capture device 104a can use static information (e.g., static IP configuration) received along with the WiFi network identifier and network key to connect with the WiFi transceiver and the Internet. The image capture device 104a can provide various such information to other image capture devices 104 via the communication links 120, enabling the other image capture devices 104 to establish network connections with the Internet without requiring manual configuration, which can be useful in implementations with large numbers of image capture devices 104. In some embodiments, the image capture device 104 use wired Ethernet connections to connect with the Internet, such as by operating using DHCP or static configuration processes.

The image capture devices 104 and sensors 112 may be registered or unregistered with each other and with a remote server (e.g., cloud-based server) in order to provide enhanced industrial monitoring and security services. For example, the image capture devices 104 can maintain a table indicating an identifier of each registered image capture device 104. When image capture devices 104 are turned on, they may thus be in a registered state or an unregistered state. In some embodiments, the image capture devices 104 automatically register various other image capture devices 104 and sensors 112 automatically, such as by providing beacon data outputted by unregistered devices to the remote server in response to which the remote server can verify the beacon data and generate a registration token corresponding to the beacon data, which can be provided to each image capture device 104 to enable the image capture device 104 to update a locally maintained registration table including each registration token (which the image capture device 104 can assign to each signal to be transmitted on behalf of the respective image capture device 104 or sensor 112). In some embodiments, the registration table is updated in batches, such as by the image capture device 104 detecting more than one beacon from unregistered devices, and providing the more than one beacon to the remote server for the remote server to update together prior to providing the updated registration table to the image capture device 104.

When each image capture device 104 turns on, the image capture device 104 can transmit an identifier of the image capture device 104 (e.g., advertise a beacon) via the network. One or more other image capture devices 104 can receive the identifier, and provide the identifier to the server. The server can verify the identifier, and generate a registration token for the image capture device 104 (or sensor 112) that turned on and provided the identifier, which can be received by each of the image capture devices 104 to authorize communication with the image capture device 104 or sensor 112 that provided the identifier. In this manner, one or more image capture devices 104 or sensors 112 may be automatically registered upon the initiation of a registration process by a user. Said registration process may be initiated via a mobile application, website, or mobile device, and the user may be presented with information and asked whether to confirm automatic registration of one or more devices. For example, an initial, unregistered image capture device 104 can be registered by the application presenting an indication of the image capture device 104 along with a user interface element that when selected can cause the image capture device 104 to be registered. The application can provide the identifier of the image capture device 104 to the remote server for registration. The application can provide beacons from multiple unregistered image capture devices 104 to the remote server for parallel registration, which can be useful for situations, such as shipping and logistics warehouses, in which unregistered devices 104 may be at a different location than where the user is operating and there may not be any pre-registered image capture devices 104. Once the process is initiated, the image capture devices 104 and/or sensors 112 may proceed in being registered as described above.

In some embodiments, one or more image capture devices 104 monitors the network connections of other image capture devices 104. For example, the image capture devices 104 can output a status of a respective network connection. The image capture devices 104 can output the status periodically, responsive to a request from a remote image capture device 104, or responsive to detecting an error condition of the network connection. The image capture devices 104 can output the status via the communication links 120. The one or more image capture devices 104 that receive the status can process the status to whether the network connection meets an error condition (e.g., the network connection is disconnected). On determining that the network connection meets the error condition, the one or more image capture devices 104 can perform various actions, such as transmitting an alert (e.g., to a user device), requesting reconfiguration information (e.g., from the IP device to which the disconnected image capture device 104 was connected) and providing the reconfiguration information to the disconnected image capture device 104, or providing restart instructions to the disconnected image capture device 104. Because the image capture devices 104 maintain the mesh network using the communications links 120, the image capture devices 104 can continue to communicate even if particular image capture devices 104 lose Internet connections, and as described herein can repair Internet connections automatically.

The sensors 112 can include any of a variety of sensors that can be used to detect and monitor parameters of the assets 116. For example, the sensors 112 can include position sensors (e.g., accelerometer, gyroscope, magnetometer, global positioning system (GPS)/global navigation and satellite system (GNSS) receiver), temperature sensors, pressure sensors, acoustic sensors (e.g., microphones or speakers), flow meters, humidity sensors, motion or proximity sensors, contact sensors (e.g., door/window sensors), level sensors, carbon monoxide sensors, smoke sensors, or water sensors. The sensors 112 can include temperature sensors used in refineries. The sensors 112 can include temperature and humidity sensors that can be used to monitor food, such as to monitor food that may be stored in an environmental controlled storage location.

The sensors 112 can include communications circuitry to communicate sensor data with the image capture devices 104. For example, the sensors 112 can communicate using various local networking protocols, such as Bluetooth, Bluetooth low energy (BLE), Zigbee, Z-wave, near field communication (NFC), or WiFi protocols.

In some embodiments, the sensors 112 communicate with one or more image capture devices 104 when in a communication range of the one or more image capture devices 104. For example, the sensors 112 can periodically output sensor data or identification data, which can be received by one or more image capture devices 104 when the sensors 112 are in communication range of the image capture device(s) 104. As discussed below with respect to FIG. 2, the image capture device 104 can authenticate the sensor 112 based on the sensor data or identification data.

The sensors 112 can be associated with assets 116. For example, the sensors 112 can be attached to respective assets (e.g., using adhesives or fastening members such as screws, bolts, or straps) or can be positioned so that the assets 116 are in a sensor range of the sensors 112.

The assets 116 can include any of a variety objects, devices, components, machinery, or persons that may be present in the environment. For example, the assets 116 can include industrial machinery, vehicles, pipes, tanks, fluids, robotic manipulators, medical supplies, barriers (e.g., doors, windows), or tools. The assets 116 can be stationary or mobile. For example, the asset 116b (and sensor 112b) may move over time from being within the field of view 108b to being within the field of view 108a; the assets 116 may move such that the sensors 112 move in and out of communication range of the various image capture devices 104.

Figure 2:
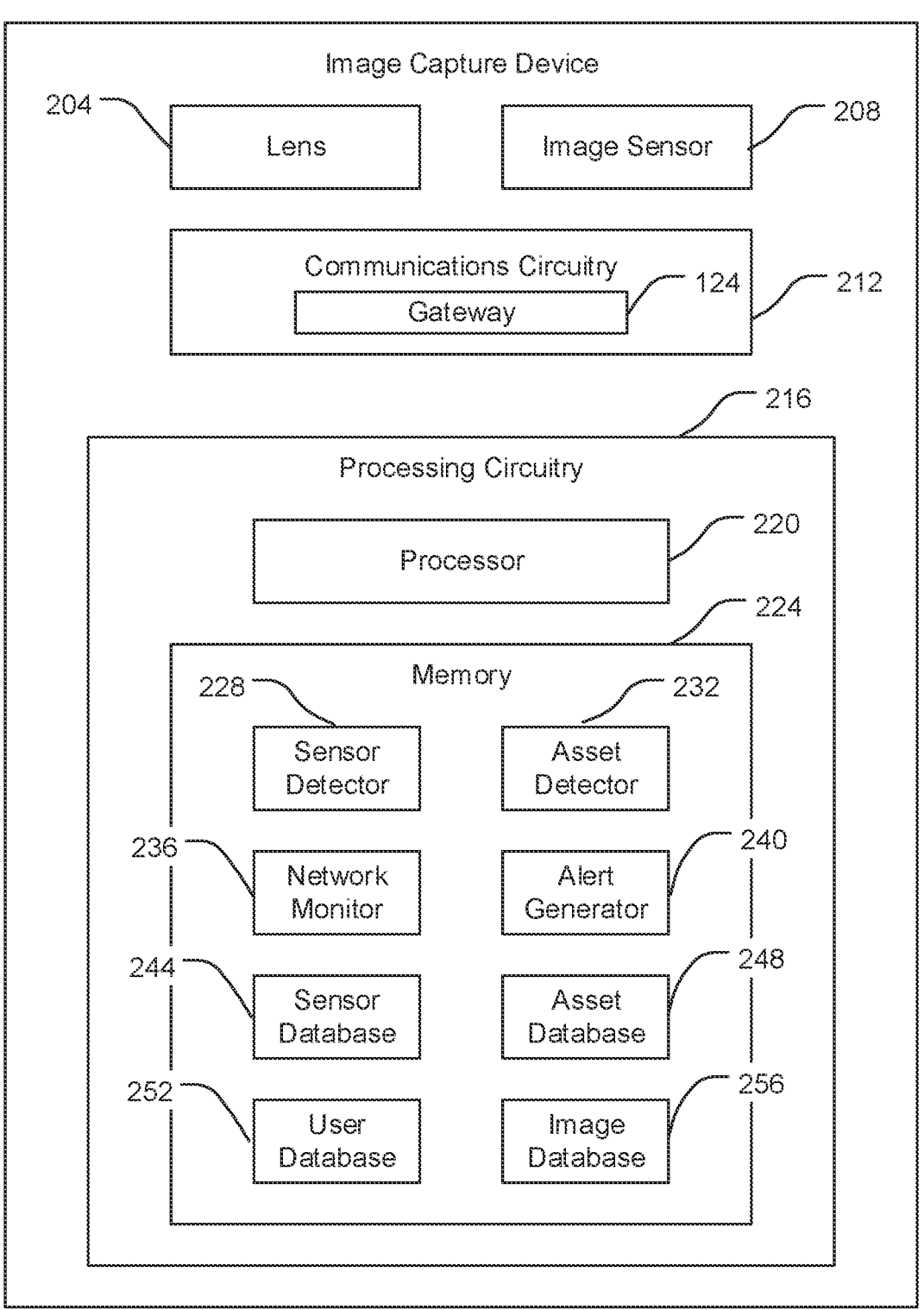
FIG. 2 is a block diagram of an image capture device which can implement a camera-based mesh network for industrial monitoring and security according to an embodiment of the present disclosure.

Referring now to FIG. 2, the image capture device 104 and feature thereof are illustrated according to an embodiment of the present disclosure. The image capture device 104 can include a lens 204 that receives light corresponding to a field of view of the image capture device 104 and provides the light to an image sensor 208 that generates one or more images based on the received light. The image sensor 208 can provide image data including the one or more images (or video, or an image stream) to processing circuitry 216 or communications circuitry 212.

The image capture devices 104 can be visible light cameras (e.g., color or black and white or grayscale), infrared cameras, ultraviolet cameras, or combinations thereof. The image capture devices 104 can be video cameras. The image capture devices 104 can each include one or more lenses, of which a zoom function can be controlled. The image capture devices 104 can have predetermined resolutions or fields of view 108.

The image sensor 208 can include sensor circuitry, including but not limited charge-coupled device (CCD) or complementary metal-oxide-semiconductor (CMOS) circuitry, which can detect the light received via the lens 204 and generate images based on the received light.

The image capture device 104 can include communications circuitry 212, which can be used to communicate data such as sensor data and image data with other image capture devices 104 and remote devices (e.g., via an internet communication). The communications circuitry 212 can include can include a cellular transceiver and/or cellular modem configured to communicate with a cellular network. The communications circuitry 212 can include a WiFi transceiver for communicating via a wireless communications network. The communications circuitry 212 can communicate via local area networks (e.g., a building LAN), wide area networks (e.g., the Internet, a cellular network), and/or conduct direct communications (e.g., NFC, Bluetooth, BLE, Zigbee, Z-wave). The communications circuitry 212 can conduct wired and/or wireless communications. For example, the communications circuitry 212 can include one or more wireless transceivers (e.g., a Wi-Fi transceiver, a Bluetooth transceiver, a Bluetooth Low Energy transceiver, a NFC transceiver, a cellular transceiver). The communications circuitry 212 can be coupled with at least one antenna that the communications circuitry 212 uses to receive and transmit data. Processing circuitry 216 can monitor a network connection of the gateway 124 with an IP network, and cause the communications circuitry 212 to reestablish the network connection responsive to detecting that the network connection is in a disconnected state.

As discussed with respect to FIG. 1, the communications circuitry 212 can communicate with the gateway 124, which can be used to communicate IP data to remote devices; the communications circuitry 212 can also directly communicate with the Internet by establishing an IP connection with the Internet. For example, the communications circuitry 212 of the image capture device 104 can provide sensor data or image data to a remote server, which can further process the sensor data or image data. The server can be any type of form of computing device that provides applications, functionality or services to one or more image capture devices 104 or other devices acting as clients. In some embodiments, the server can be an image capture device 104. The server can be deployed in a data center or cloud computing environment accessible via one or more networks. The image capture devices 104 and sensors 112 can use and leverage the computing power and resources of the server. The server can implement any portion of the sensor validation and alert generation pipeline described herein, and in some cases, portions of the sensor validation and alert generation pipeline not performed by image capture devices 104. The server may be used to update the image capture devices 104 and sensors 112 with any update to the applications, software, executable instructions and/or data. The server can monitor or receive statuses of the image capture devices 104, such as statuses indicating whether network connections between the image capture devices 104 and IP networks are operational, in order to initiate re-establishment of network connections.

As described herein, processing circuitry 216 can include and maintain various databases (e.g., sensor database 244, asset database 248, user database 252, image database 256). The communications circuitry 212 can communicate data from the databases to remote image capture devices 104, and update the databases using data received from remote image capture devices 104, such as to share locations of sensors 112 and assets 116.

The image capture device 104 includes processing circuitry 216. The processing circuitry 216 can include a processor 220 and memory 224. The processor 220 may be implemented as a specific purpose processor, an application specific integrated circuit (ASIC), one or more field programmable gate arrays (FPGAs), a group of processing components, or other suitable electronic processing components. The memory 224 is one or more devices (e.g., RAM, ROM, flash memory, hard disk storage) for storing data and computer code for completing and facilitating the various user or client processes, layers, and modules described in the present disclosure. The memory 224 may be or include volatile memory or non-volatile memory and may include database components, object code components, script components, or any other type of information structure for supporting the various activities and information structures of the inventive concepts disclosed herein. The memory 224 is communicably connected to the processor 220 and includes computer code or instruction modules for executing one or more processes described herein. The memory 224 can include various circuits, software engines, and/or modules that cause the processor 220 to execute the systems and methods described herein.

The processing circuitry 216 can include a sensor detector 228. The sensor detector 228 can include any function, operation, routine, logic, or instructions to perform functions such as object recognition for detecting sensors 112 from images. The sensor detector 228 can perform any of a variety of object recognition operations to detect sensors 112 using image data received from the image sensor 208. For example, the sensor detector 228 can receive image data corresponding to one or more images of the environment in which the sensor 112 is present to detect the sensor 112 or features thereof.

The sensor detector 228 can perform object detection by processing elements of the images, such as pixels or group of pixels. For example, the sensor detector 228 can identify features such as colors, shapes, edges, contrast between pixels, and spatial relationships between pixels. The sensor detector 228 can detect objects by operating spatial filters, segmentation, or machine learning models trained to detect objects. The sensor detector 228 can identify candidate sensors from the images, such as groups of pixels representing edges, compare the candidate sensors to one or more template sensors (e.g., template sensors or features thereof in sensor database 244), and identify the sensor 112 from the images based on candidate sensors that match the template sensors.

The processing circuitry 216 can include an asset detector 232. The asset detector 232 can include any function, operation, routine, logic, or instructions to perform functions such as object recognition for detecting assets 116 from images. The asset detector 232 can be similar or identical to the sensor detector 228. For example, the asset detector 232 can perform feature matching of features of image data to template features of assets maintained in the asset database 248 to detect the assets 116.

The processing circuitry 216 can include a sensor database 244 and an asset database 248. The sensor database 244 can include data structures that include data regarding sensors 112. For example, the sensor database 244 can maintain, for one or more sensors 112, a data structure including a sensor identifier of the sensor 112 and data assigned to the sensor identifier, such as image data or sensor data. In some embodiments, the processing circuitry 216 generates the data structure or updates the sensor database 244 responsive to detecting the sensor 112 using the sensor detector 228, such as by assigning image data, position data, or sensor data of the sensor 112 to the sensor identifier of the sensor 112. Similarly, the asset database 248 can maintain, for one or more assets 116, a data structure including an asset identifier of the asset 116 and data assigned to the asset identifier, such as image data regarding the asset, and the processing circuitry 216 can generate the data structure or update the asset database 248 responsive to detecting the asset 116 using the asset detector 232, such as by assigning image data, position/location data, or identification data (e.g., facial recognition data) to the asset identifier of the asset 116.

In some embodiments, the asset database 248 maintains an expected location for one or more respective assets 116. The expected location can be a specific position, or a region in the environment (e.g., building, room, space) in which the asset 116 is expected or authorized to be located.

The processing circuitry 216 can include a sensor validator 236. The sensor validator 236 can include any function, operation, routine, logic, or instructions to perform functions such as validating or authenticating sensors 112 and data received from sensors 112. For example, the sensor validator 236 can confirm that the sensor 112 is the device it is expected to be, is properly authorized to operate in the network 100, or is authorized to be detecting data regarding the asset 116 with which the sensor 112 is associated. The sensor validator 236 can process sensor data received from the sensor 112 to validate the sensor 112, such as to validate the identity of the sensor 112, the location of the sensor 112, or the sensor data outputted by the sensor 112. In some embodiments, the sensor validator 236 extracts a sensor identifier of the sensor 112 from the sensor data.

In some embodiments, the sensor validator 236 applies a cryptographic function to the sensor data to validate the sensor 112. For example, the sensor validator 236 can apply any of a variety of cryptographic functions, such as symmetric or asymmetric (e.g., public key) cryptographic functions, to validate the sensor data. In some embodiments, the sensor 112 applies a public key to the sensor data or portions thereof to encrypt or encode the sensor data, and the sensor validator 236 applies a private key corresponding to the public key to the received sensor data to decrypt or decode the sensor data. In some embodiments, the sensor 112 generates the sensor data to include a cryptographic beacon, which the sensor validator 236 can process to retrieve the sensor identifier. The sensor validator 236 can validate the sensor 112 by comparing the cryptographic beacon (e.g., identifier data extracted from the cryptographic beacon) to at least one of an expected location or an expected identifier of the sensor 112 (each of which may be maintained in the sensor database 244).

The processing circuitry 216 can include a user database 252. The user database 252 can include data structures that assign data regarding users of assets 116 and sensors 112 to user identifiers of the users. For example, the user database 252 can assign usage permissions of assets 116 and sensors 112 to the user identifiers, such as to indicate which assets 116 particular users are authorized to operate. In some embodiments, the processing circuitry 216 updates the user database 252 responsive to the asset detector 232 applying facial recognition to image data in order to detect users in the environment. In some embodiments, the user database 252 maintains facial data (e.g., images, portions of images, facial feature data) regarding the users, which can be used by asset detector 232 to perform facial recognition, and can be updated based on image data used by asset detector 232 to detect users in the environment.

The processing circuitry 216 can include an image database 256. The image database 256 may be implemented by one or more memory hardware components of memory 224, such as a memory card (e.g., SD card). The image database 256 can maintain the one or more images detected by the image capture device 104, such as image data regarding sensors 112 or assets 116. In some embodiments, the image database 256 maintains a relatively limited amount of image data, such as a predetermined number of frames of image data (e.g., frames corresponding to a predetermined duration of time, such as the previous minute, previous ten minutes, previous hour, or previous day's images). Additional image data may be maintained on a remote device (e.g., a remote server, such as a cloud server).

In some embodiments, the processing circuitry 216 monitors a status of the image database 256. For example, the processing circuitry 216 can monitor a status of the memory hardware that implements the image database 256. The status may indicate a capacity of the image database 256. The status may indicate an operational condition of the image database 256, such as an error condition indicating that the image database 256 cannot be written to or is corrupted. The processing circuitry 216 can use the communications circuitry 212 to provide the status of the image database 256 to remote devices (e.g., other image capture devices 104, a cloud server) via communication links 120. For example, the processing circuitry 216 can provide the status of the image database 256 on a periodic basis, responsive to a request from a remote device, or responsive to detecting a change in the status of the image database 256. For example, the image capture device 104a can transmit a request via communication link 120a to the image capture device 104b for the status of the image database 256 of the image capture device 104b, which can cause the processing circuitry 216 of the image capture device 104b to detect the status of the image database 256 and provide the detected status via the communication link 120a to the image capture device 104a. Responsive to determining that the received status indicates an error condition of the image database 256, the image capture device 104a can provide an alert to various other devices (e.g., via gateway 124). Based on the image capture device 104b being unable to record images, the remaining image capture devices 104 can identify one or more image capture devices 104 having fields of view 108 that at least partially overlap the field of view 108b of the image capture device 104b, which can be used for the various sensor 112 and asset 116 detection, image recognition, and authentication processes described herein.

The processing circuitry 216 can determine position data regarding the sensor 112. The position data can include at least one of a position or an orientation of the sensor 112. The position data can include a location coordinate (e.g., GPS coordinate) or a region in the environment in which the sensor 112 is located (e.g., in a particular room, building, or other space).

The processing circuitry 216 can use various data and signals regarding the sensor 112 to determine the position data. For example, the processing circuitry 216 can use information such as at least one of a network connection with the sensor 112, image data of the sensor 112 received from a remote image capture device 104, or remote position data regarding the sensor 112 received from a remote image capture device 104 to determine the position data.

The processing circuitry 216 can use the network connection with the sensor 112 to determine parameters of the network connection, such as signal strength or signal quality. For example, the processing circuitry 216 can use the signal strength or signal quality to determine a range (e.g., distance) from the image capture device 104 to the sensor 112. The processing circuitry 216 can use any of a variety of methods, such as lookup tables, functions, or models, to determine the range. For example, the processing circuitry 216 can provide the signal strength to a function that determines range based on signal strength (e.g., based on signal strength being quadratically related to range). The processing circuitry 216 can use the range to determine the position of the sensor 112 (e.g., by combining the range with other data regarding the position of the sensor 112 as described herein).

The processing circuitry 216 can use information received from the other image capture device(s) 104 to determine the position of the sensor 112. For example, the processing circuitry 216 can receive image data from the other image capture devices 104, and identify the sensor 112 from the image data (e.g., using sensor detector 228 or based on identification of the sensor 112 by the other image capture devices 104). The processing circuitry 216 can receive signal quality or signal strength data regarding the sensor 112 based on a network connection between the other image capture devices 104 and the sensor 112. The processing circuitry 216 can receive position data received from the other image capture device(s) 104.

In some embodiments, the processing circuitry 216 uses a known position or orientation of the image capture device 104 and the other image capture devices 104 to determine the position of the sensor 112, such as to triangulate the sensor 112. For example, the processing circuitry 216 can use signal strength data to determine ranges from the image capture devices 104 to the sensor 112, and determine the position of the sensor 112 based on overlap of the determined ranges.

In some embodiments, the processing circuitry 216 determines an orientation of the sensor 112 relative to the other image capture device 104 based on the image data received from the other image capture device 104 and an orientation of the other image capture device 104, such as the field of view 108 of the other image capture device 104 or an angle at which the field of view 108 is oriented relative to a frame of reference of the image capture device 104 or the environment. For example, the processing circuitry 216 can process the images in which the sensor 112 is identified to identify one or more pixels corresponding to the sensor 112, and determine the orientation of the sensor 112 relative to the other image capture device 104 using the one or more pixels, such as by identifying a vector that would go from the other image capture device 104 to the sensor 112 using the one or more pixels.

In some embodiments, the processing circuitry 216 generates a request for data regarding the sensor 112 using the sensor identifier of the sensor 112 determined by the sensor validator 236. For example, the processing circuitry 216 can provide the sensor identifier to one or more remote image capture devices 104 in communication with the image capture device 104 (e.g., via communication links 120) to cause the remote image capture devices 104 to search respective sensor databases 244 to provide image data or position data regarding the sensor 112 using the sensor identifier of the sensor 112. In some embodiments, the remote image capture devices 104 can forward the request to other remote image capture devices 104 that may not be in communication range of the image capture device 104 that generated the request. Accordingly, the image capture devices 104 can leverage the communication links of the mesh network to communicate data regarding sensors 112 even if the image capture devices 104 are not directly in communication.

In some embodiments, the processing circuitry 216 weighs candidate positions determined based on various factors described herein in order to determine the position of the sensor 112. For example, the processing circuitry 216 can apply a first weight to the range to the sensor 112 determined based on signal strength, and a second weight to the orientation of the sensor 112 determined based on images received from remote image capture devices 104. The weights may be determined based on various factors, such as signal quality, image quality, or match scores used to detect the sensor 112 from image data.

The processing circuitry 216 can determine whether the sensor 112 is in an image capture range of the image capture device 104 based on the determined position of the sensor 112. For example, the processing circuitry 216 can retrieve the field of view 108 of the image capture device 104 and compare the position of the sensor 112 to the field of view 108 to determine whether the sensor 112 is in the image capture range, such as to determine whether the position of the sensor 112 is within or coincides with the field of view 108.

In response to determining that the sensor 112 is in the image capture range of the image capture device 104, the processing circuitry 216 can retrieve one or more images maintained by the image database 256 in which the sensor 112 would be expected to be present. The processing circuitry 216 can process the one or more images (e.g., using sensor detector 228) to detect the sensor 112 and confirm the position of the sensor 112. As such, the processing circuitry 216 can enable an integrated solution in which assets 116 can be monitored, tracked, and authenticated using both sensor data and image data.

In some embodiments, the processing circuitry 216 can determine that the sensor 112 is occluded or otherwise not present in the one or more images as expected. For example, an object may be present in the field of view 108 of the image capture device 104 between the image capture device 104 and the sensor 112, or the sensor 112 may not be in the position that was expected based on determining the position of the sensor 112. In response to not detecting the sensor 112 in the one or more images, the processing circuitry 216 can generate a request to cause at least one remote image capture device 104 to attempt to detect the sensor 112. In some embodiments, the processing circuitry 216 maintains a map of the image capture devices 104 and the fields of view 108 of the image capture devices 104, and uses the map to identify one or more remote image capture devices 104 to request to detect the sensor 112. For example, the processing circuitry 216 can determine, from the map, one or more remote image capture devices 104 that have fields of view 108 in which the sensor 112 is expected to be located. The remote image capture devices 104 may confirm the position (e.g., using locally maintain image data) or indicate that the sensor 112 is not present.

The processing circuitry 216 can use the detected position of the sensor 112 to track the sensor 112. For example, the processing circuitry 216 can update the sensor database 244 to include the detected position of the sensor 112.

The processing circuitry 216 can include an alert generator 240. The alert generator 240 can include any function, operation, routine, logic, or instructions to perform functions such as monitoring sensors 112 and assets 116 and generating alerts or alerts based on statuses or behaviors of sensors 112 and assets 116. The alert generator 240 can generate various alarms regarding the sensor 112 or asset 116 based on the sensor data or image data satisfying alarm conditions (e.g., the asset 116 is not in the expected location; the asset 116 is not functional; the asset 116 is in a fire condition).

Based on whether the sensor 112 is or is not confirmed to be in the detected position, the alert generator 240 may generate alerts regarding the sensor 112 (or the asset 116 corresponding to the sensor 112). For example, responsive to detecting the sensor 112 is at the detected position (e.g., the position confirmed using image data from the image database 256), the alert generator 240 can compare the detected position to an expected location, which may be an expected location maintained in sensor database 244 regarding the sensor 112. The expected location may be a specific coordinate location (e.g., GPS coordinates), or may be a region in the environment, such as a building or room. In response to the comparison indicating that the detected position matches the expected location, the alert generator 240 can indicate that the sensor 112 (and the asset 116) is at the expected location. In response to the comparison indicating that the detected position does not match the expected location, the alert generator 240 can generate an alert indicating that the sensor 112 is not at the expected location.

The alert generator 240 can update the sensor database 244 or asset database 248 based on the alert. The alert generator 240 can transmit the alert via the communications circuitry 212 to remote devices. The alert generator 240 can use output devices of the image capture device 104, such as lights, displays, or speakers, to output the alert.

In response to detecting that the sensor 112 is not at the detected position, the alert generator 240 can compare the position at which the sensor 112 was expected to be (e.g., the position that was expected to be confirmed using image data from the image database 256) to the expected location. Responsive to determining that the expected position does not match the expected location, the alert generator 240 can generate an alert indicating that the sensor 112 is not at the expected location.

For example, the sensor 112 may be an asset tag coupled with the asset 116. Using the image capture devices 104, the location of the asset 116 can be monitored as the asset 116 moves throughout the environment, because the sensor 112 periodically communicates sensor data, which the image capture devices 104 can use to determine to confirm the location of the asset 116. As such, the mesh network enabled by the image capture devices 104 can be used to precisely monitor the locations of assets 116 and generate alerts when the assets 116 are not at expected locations, such as authorized locations.

In some embodiments, the alert generator 240 generates alerts based on whether a user is authorized to use the sensor 112 or asset 116. For example, the alert generator 240 can use the asset detector 232 to perform facial recognition to identify the user (e.g., determine a user identifier of the user). The alert generator 240 can use the user database 252, sensor database 244, or asset database 248 to compare user identifier to respective sensor identifiers or asset identifiers to determine whether the user identifier matches the respective sensor identifiers or asset identifiers. The alert generator 240 can output an alert responsive to the user identifier not matching the respective sensor identifier or asset identifier.

The processing circuitry 216 can use at least one of the one or more images or the sensor data to evaluate a status of the asset 116. For example, the processing circuitry 216 can compare the images or sensor data to one or more predetermined template images (e.g., images indicating how the asset 116 is expected to appear in certain operational states), and determine the status based on the comparison. The processing circuitry 216 can compare the sensor data to one or more predetermined threshold values corresponding to respective statuses, and determine the status based on the sensor data matching the predetermined threshold value. For example, if the sensor 112 is a microphone that provides acoustic data, the processing circuitry 216 can compare frequency data regarding the asset 116 to predetermined frequency thresholds that are assigned to particular statuses of the asset 116 to determine the status of the asset 116.

In some embodiments, the processing circuitry 216 performs predictive maintenance based on the one or more images of the sensor 112 or the sensor data regarding the asset 116. For example, the processing circuitry 216 can compare the determined status to a maintenance condition to determine that the status meets the maintenance condition. The processing circuitry 216 can maintain a maintenance model regarding the asset, such as a model relating the status of the asset 116 to an amount of time until maintenance should be performed, to determine a time at which to perform maintenance. In some embodiments, the processing circuitry 216 can process the sensor data to determine whether a firmware update should be provided to the sensor 112 (e.g., by comparing a firmware identifier provided by the sensor 112 with the sensor data to a firmware identifier of a current version of the firmware), request the firmware update via the IP network, and provide the firmware update to the sensor 112 using the connection with the sensor 112.

Referring now to FIG. 3, a method 300 of operating a camera-based mesh network is illustrated according to an embodiment of the present disclosure. The method 300 can be performed using various systems and devices described herein, such as the image capture devices 104 and sensors 112.

At 305, image data of an environment is maintained. The image data can be maintained by an image capture device, which can be one of a number of image capture devices located throughout an environment. The image capture device can periodically detect the image data, such as by detecting a plurality of images at a predetermined frame rate or detection schedule. The image capture device can detect the image data responsive to a remote command or a condition in the environment, such as by being triggered responsive to signals from a motion sensor, changes in lighting, or time of day. The image data can be maintained for a predetermined duration of time (e.g., one hour, one day, one week) before being expunged. The image data can correspond to a field of view of the image capture device, which may be controlled (e.g., based on controlling zoom, pan, or tilt of the image capture device). The image data can be maintained using local memory of the image capture device, using a server remote from the image capture device that receives image data from the image capture device, or any combination thereof.

At 310, sensor data is received by the image capture device from a sensor via a network connection with the sensor. The image capture device can receive the sensor data using a network connection that is a short range connection, such as BLE. The image capture device can communicate sensor data and other data with remote image capture devices using various networking protocols, such as BLE or IP protocols.

The sensors can include position sensors (e.g., accelerometer, gyroscope, magnetometer, global positioning system (GPS)/global navigation and satellite system (GNSS) receiver), temperature sensors, pressure sensors, acoustic sensors (e.g., microphones), flow meters, humidity sensors, motion or proximity sensors, contact sensors (e.g., door/window sensors), level sensors, or water sensors. The sensors can generate and transmit the sensor data based on monitoring any of a variety of assets. For example, the sensors can generate or transmit sensor data at a predetermined sampling rate, or can transmit sensor data responsive to the sensor data meeting transmission conditions (e.g., meeting particular thresholds regarding the sensor data). The sensors can encrypt the sensor data using symmetric or asymmetric encryption methods, such as public key encryption. The sensors can generate the sensor data to include a sensor identifier of the sensors, enabling the image capture device to identify the sensors using the sensor data.

At 315, the sensor is validated based on the sensor data. For example, the image capture device can apply a cryptographic function to the sensor data to validate the sensor. For example, the image capture device can apply any of a variety of cryptographic functions, such as symmetric or asymmetric (e.g., public key) cryptographic functions, to validate the sensor data. In some embodiments, the sensor applies a public key to the sensor data or portions thereof to encrypt or encode the sensor data, and the image capture device applies a private key corresponding to the public key to the received sensor data to decrypt or decode the sensor data. In some embodiments, the sensor generates the sensor data to include a cryptographic beacon, which the image capture device can process to retrieve the sensor identifier.

At 320, position data regarding the sensor is determined based on the network connection and remote image data regarding the sensor. For example, the image capture device can triangulate the sensor using the network connection and remote image data. The image capture device can monitor conditions or parameters of the network connection such as signal quality and signal strength, and estimate a range (e.g., distance) to the sensor based on the parameters of the network connection.

The image capture device can receive the remote image data from one or more remote image capture devices. The image capture device can request the remote image data from the one or more remote image capture devices responsive to receiving the sensor data from the sensor or responsive to validating the sensor. The image capture device can selectively request the remote image data by identifying one or more selected remote image capture devices to which to provide the request, such as by using a map of the remote image capture devices based on which the image capture device can identify remote image capture devices which may have the sensor in respective fields of view. The image capture device can include a sensor identifier of the sensor in the request, which can enable the remote image capture devices to process respective image data to identify the sensor (e.g., if the image data has been tagged with the sensor identifier).

The position data can be determined by combining various indicators of the position of the sensor. For example, the position data can be determined using the range to the sensor, as well as sensor position or orientation information determined based on the remote image data (e.g., by processing the remote image data to determine at least one of a distance or an orientation of the sensor relative to the remote image capture device, and applying the at least one of the distance or the orientation to a known position of the remote image capture device).

At 325, the position data is used to determine if the sensor is in range of the image capture device and to retrieve images of the sensor. For example, a field of view of the image capture device can be identified, and compared to the determined position of the sensor. The sensor can be determined to be in range (e.g., visual range) of the image capture device responsive to determining that the position of the sensor falls within the field of view.

In response to determining that the sensor is in range of the image capture device, the image capture device can retrieve one or more images of the sensor. For example, the image capture device can identify one or more images having a timestamp corresponding to when the sensor data was received. The image capture device can perform any of a variety of object recognition processes, such as template matching, to identify the sensor from the retrieved one or more images. In some embodiments, the image capture device performs any of a variety of object recognition processes to identify the assets with which the sensor is associated.

At 330, an alert is generated regarding the sensor based on the images and the sensor data. Any of a variety of alert conditions can be monitored, such as by being evaluated responsive to determining that the sensor is in range of the image capture device or retrieving images of the sensor.

In some embodiments, the alert is generated based on comparing the position of the sensor to an expected position of the sensor (or of the asset with which the sensor is associated). For example, responsive to detecting the sensor is at the detected position (e.g., the position confirmed using image data), the detected position can be compared to an expected location. The expected location may be a specific coordinate location (e.g., GPS coordinates), or may be a region in the environment, such as a building or room. In response to the comparison indicating that the detected position matches the expected location, the sensor can be determined to be at the expected location. In response to the comparison indicating that the detected position does not match the expected location, an alert can be generated indicating that the sensor is not at the expected location.

In some embodiments, the alert is generated based on whether a user is authorized to use the sensor or the asset. For example, facial recognition can be performed to identify a user from the images of the sensor or the asset, and determine a user identifier of the user. The user identifier can be used to perform a lookup in a user database, sensor database, or asset database to determine whether the user identifier is associated with a status of being authorized to use the sensor or asset.

Figure 4:
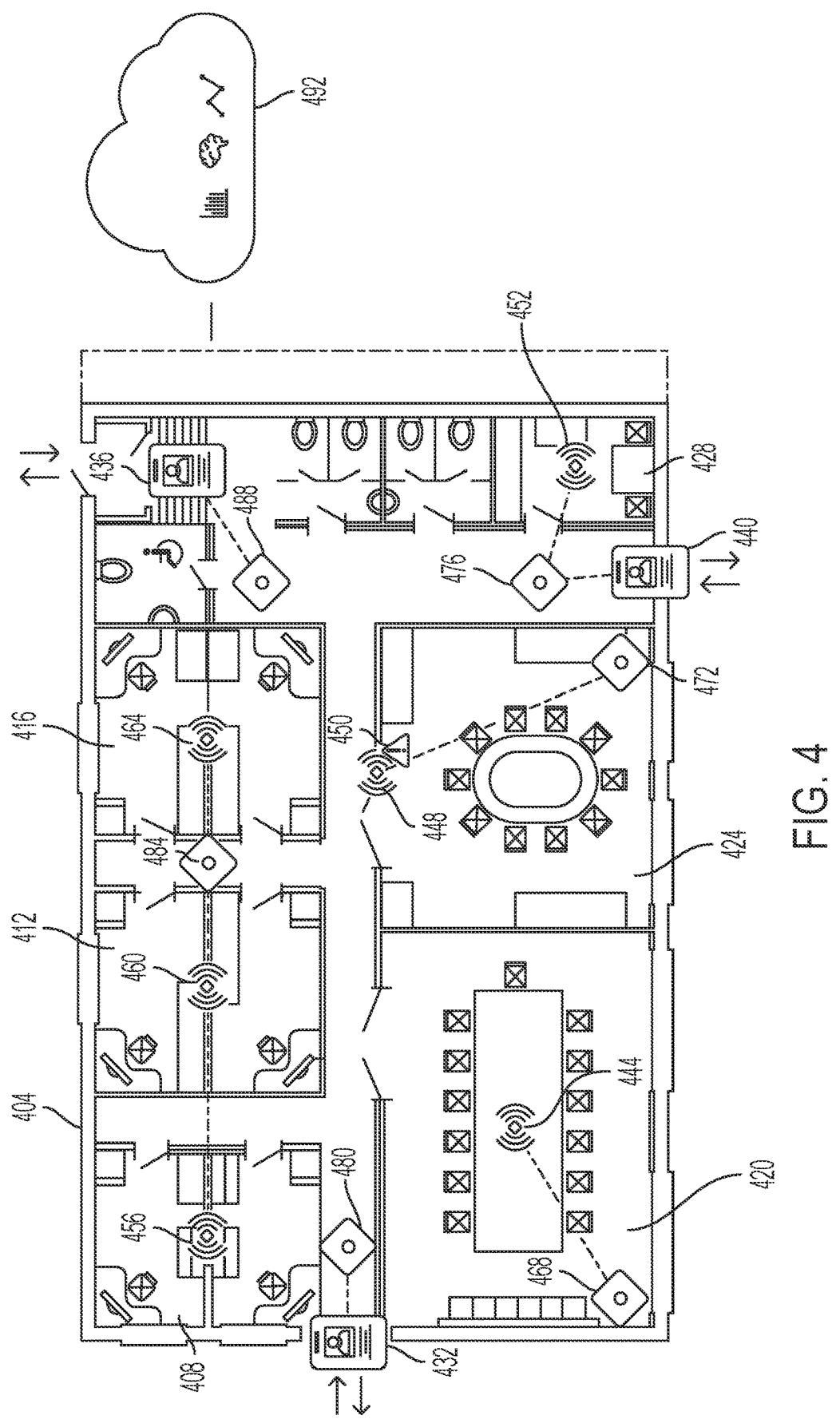
FIG. 4 is a schematic diagram of a camera-based network implemented in a building according to an embodiment of the present disclosure.

Referring now to FIG. 4, a mesh network 400 implemented in a building 404 is illustrated according to an embodiment of the present disclosure. The mesh network 400 can incorporate features of various systems and devices described herein, such as the image capture devices 104 and sensors 112. As described in further detail below, the mesh network 400 can be used to operate with sensors that monitor doors, windows, occupancy, and environmental conditions, such as to generate alerts based on sensor data responsive to policies such as temperature thresholds.

The building 404 can be an office, warehouse, storage facility, refinery, manufacturing facility, plant, or any portion or combination thereof. The building can include various rooms 408, 412, 416, 420, 424, 428, which may be accessed via doors and corridors, and may have windows.

The building 404 can include access points 432, 436, 440. The access points 432, 436, 440 can include access sensors that detect information regarding personnel moving in at least one direction through the access points 432, 436, 440, enabling tracking of the personnel based on the detected information. For example, the access sensors can include card readers or other devices that provide identification information to the access sensors (e.g., RFID or BLE tags or badges).

Various sensors 444, 448, 452, 456, 460, 464, which can include features of the various sensors 112 described herein, can be provided in the building 404, including inside of the rooms of the building 404. For example, the sensors 444, 448, 452, 456, 460, 464 can include temperature sensors, door sensors, window sensors, motion sensors, occupancy sensors, and humidity sensors.

Various image capture devices 468, 472, 476, 480, 484, 488, which can include features of the image capture devices 104 described herein, can be provided in the building 404, and can communicate with one another using a mesh network, such as a BLE mesh network, as well as with a server 492. The image capture device 468 can be provided in room 420 along with sensor 444. The image capture device 468 can be oriented to have a field of view that the sensor 444 falls within. The image capture device 468 can establish a communications link with the sensor 444 to receive sensor data from the sensor 444. For example, the sensor 444 can be an occupancy sensor, and the image capture device 468 can receive occupancy data from the sensor 444 and provide the occupancy data to the server 492. At least one of the image capture device 468 or the server 492 can validate the occupancy data by identifying a time stamp at which the occupancy data was detected and identify corresponding images of the sensor 444 and room 420 detected by the image capture device 468 at the time stamp at which the occupancy data was detected.

The image capture device 472 can be provided in room 424 along with the sensor 448. Sensor 448 can be a door sensor, which can monitor a door or a position of the door, such as to indicate whether the door is open or closed, a time stamp associated with opening or closing the door, or a duration of time that the door is open or closed. The sensor 448 or the server 492 can generate an alert 450 responsive to the door being open (e.g., responsive to the door being opened for more than a threshold amount of time, which may vary dynamically depending on the time of day or the day of the week). In response to the alert 450, the image capture device 472 or the server 492 can process the images detected by the image capture device 472 to verify that the door is open, and also to use a time stamp associated with the door being open (e.g., a time stamp at which the sensor 448 detected that the door opened) to identify one or more images corresponding to the time stamp, such as to identify a person or other cause of the door being opened. The image capture device 472 or server 492 can take further action responsive to detection the cause of the door being opened. For example, the image capture device 472 or server 492 can disable the alert 450 or transmit an indication that the alert 450 is no longer needed responsive to determining that the door was opened by a user authorized to open the door at the time stamp and/or for a period of time longer than the threshold amount of time, such as if the door was opened by maintenance staff. The image capture device 472 or server 492 can forward the alert (e.g., with an indication that the alert has been verified) responsive to determining that the door was open by a user not authorized to open the door.

The image capture device 476 can monitor the access point 440, such as to operate as a camera monitoring an entry door. Responsive to the access point 440 receiving identification data (e.g., an RFID or Bluetooth sensor receiving identification data from an identification device of a user), the access point 440 can communicate the identification data to the image capture device 476 using the mesh network. The image capture device 476 can retrieve one or more images associated with a time stamp at which the identification data was received by the access point 440, and use the retrieved images to identify a user that moved through the access point 440 and at the time stamp (e.g., a user that used the identification device). The image capture device 476 or server 492 can compare an identifier of the user detected using the one or more images to the identification data received from the identification device to verify that the user that moved through the access point 440 is the owner of the identification device.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, soc (system on chip), som (system on module) or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A system, comprising:
a first image capture device comprising:
communications circuitry connected with a remote server; and
one or more processors configured to:
receive, from plurality of image capture devices that are in an unregistered state with respect to the remote server, via a network, plurality of identifiers of each image capture device of the plurality of image capture devices;
perform a batch registration process of the plurality of image capture devices by:
transmitting the plurality of identifiers of the plurality of image capture devices to the remote server in a single communication;
receiving, from the remote server, responsive to the remote server verifying the plurality of identifiers, a plurality of registration tokens corresponding to each of the plurality of image capture devices; and
assigning the plurality of identifiers of the plurality of image capture devices and the plurality of registration tokens to a registration table to register each image capture device to a registered state;
retrieve, from one or more of the plurality of image capture devices, a status indicating an error of a network connection with each of the one or more image capture devices of the plurality of image capture devices; and
communicate sensor data from each of the plurality of image capture devices that do not include the error of the network connection to the remote server, responsive to each image capture device being registered to the registered state using the batch registration process and the status not indicating the error.

2. The system of claim 1, wherein the one or more processors are configured to:
receive the sensor data from a second image capture device of the plurality of image capture devices;
assign the registration token to a transmit signal comprising the sensor data; and
transmit the transmit signal on behalf of the second image capture device.

3. The system of claim 1, wherein each identifier comprises beacon data.

4. The system of claim 1, wherein the first image capture device comprises:
an image sensor; and
communications circuitry configured to receive the plurality of identifiers from the plurality of image capture devices and transmit the plurality of identifiers to the remote server.

5. The system of claim 1, wherein the one or more processors are configured to:
receive, via a communication link between the first image capture device and the plurality of image capture devices, the status of the network connection of each image capture device with a gateway;
request, from the gateway, responsive to the status indicating the error, reconfiguration information for a second image capture device of the plurality of image capture devices; and
provide the reconfiguration information to the second image capture device via the communication link to cause the second image capture device to reestablish the network connection with the gateway.

6. The system of claim 1, wherein the one or more processors are configured to perform the batch registration process of the plurality of image capture devices providing the plurality of identifiers to the remote server, receiving respective registration tokens for each of at least a subset of the plurality of image capture devices verified by the remote server, and assigning the respective registration tokens to the registration table.

7. The system of claim 1, wherein the one or more processors are configured to establish a wireless communication link with the plurality of image capture devices to receive the plurality of identifiers via the wireless communication link.

8. The system of claim 1, wherein the first image capture device has a field of view to monitor a building.

9. The system of claim 1, wherein the first image capture device has a field of view to monitor an access point of a building.

10. The system of claim 9, wherein the one or more processors are configured to:
detect an alert regarding a door of the access point being opened;
process one or more images of the access point; and
disable the alert or transmit an indication that the alert is no longer needed responsive to a determination that the door was opened by a user authorized to open the door.

11. A method, comprising:
receiving, by one or more processors using communications circuitry of a first image capture device connected with a remote server from a plurality of image capture devices that are in an unregistered state with respect to the remote server, via a network, a plurality of identifiers of the plurality of image capture devices;

performing, by the one or more processors, a batch registration process of the plurality of image capture devices by:

providing, by the one or more processors, the plurality of identifiers of the plurality of image capture devices to the remote server in a single communication session;

receiving, by the one or more processors, from the remote server, responsive to the remote server verifying the plurality of identifiers, a plurality of registration tokens corresponding to each of the plurality of image capture devices; and assigning, by the one or more processors, the plurality of identifiers of the plurality of image capture devices and the plurality of registration tokens to a registration table to register each image capture device to a registered state;

retrieving, by the one or more processors from one or more of the plurality of image capture devices, a status indicating an error of a network connection with each of the one or more image capture devices of the plurality of image capture devices; and communicating, by the one or more processors, sensor data from each of the plurality of image capture devices that do not include the error of the network connection to the remote server, responsive to each image capture device being registered to the registered state using the batch registration process and the status not indicating the error.

12. The method of claim 11, comprising:
receiving, by the one or more processors, the sensor data from a second image capture device of the plurality of image capture devices;

assigning, by the one or more processors, the registration token to a transmit signal comprising the sensor data; and transmitting, by the one or more processors, the transmit signal on behalf of the second image capture device.

13. The method of claim 11, wherein each identifier comprises beacon data.

14. The method of claim 11, comprising:
receiving, by the one or more processors via a communication link between the first image capture device and the plurality of image capture devices, the status of the network connection of a second image capture device with a gateway;

requesting, by the one or more processors, from the gateway, responsive to the status indicating the error, reconfiguration information for the second image capture device of the plurality of image capture devices; and providing, by the one or more processors, the reconfiguration information to the second image capture device via the communication link to cause the second image capture device to reestablish the network connection with the gateway.

15. The method of claim 11, comprising:
performing, by the one or more processors, the batch registration process of the plurality of image capture devices providing the plurality of identifiers to the remote server, receiving respective registration tokens for each of at least a subset of the plurality of image capture devices verified by the remote server, and assigning the respective registration tokens to the registration table.

16. The method of claim 11, comprising:
establishing, by the one or more processors, a wireless communication link with the plurality of image capture devices to receive the plurality of identifiers via the wireless communication link.

17. A system, comprising:
one or more processors configured to:
receive, from a plurality of image capture devices that are in an unregistered state with respect to a remote server, via a network, a plurality of identifiers of each image capture device;

perform a batch registration process of the plurality of image capture devices by:
receiving, from the remote server, responsive to the remote server verifying the plurality of identifiers, a plurality of registration tokens corresponding to each of the plurality of image capture devices in a single communication session; and assigning the plurality of identifiers of the plurality of image capture devices and the plurality of registration tokens to a registration table to register each image capture device to a registered state;

retrieve, from one or more of the plurality of image capture devices, a status indicating an error of a network connection with each of the one or more image capture devices of the plurality of image capture devices; and communicate sensor data from each of the plurality of image capture devices that do not include the error of the network connection to the remote server, responsive to each image capture device being registered to the registered state using the batch registration and the status not indicating the error.

18. The system of claim 17, wherein the one or more processors are configured to:
receive the sensor data from an image capture device of the plurality of image capture devices;

assign a registration token plurality of registration tokens to a transmit signal comprising the sensor data; and transmit the transmit signal on behalf of the image capture device to a remote device.

19. The system of claim 17, wherein each identifier comprises beacon data.

20. The system of claim 17, wherein the one or more processors are configured to:
receive, via a communication link with the plurality of image capture devices, the status of the network connection of an image capture device of the plurality of image capture devices with a gateway;

request, from the gateway, responsive to the status indicating the error, reconfiguration information for the image capture device; and provide the reconfiguration information to the image capture device via the communication link to cause the image capture device to reestablish the network connection with the gateway.

\* \* \* \* \*